United States Patent
Zhang et al.

(10) Patent No.: US 12,480,371 B1
(45) Date of Patent: Nov. 25, 2025

(54) DEVICE AND METHOD FOR RAPIDLY REGULATING DOWNHOLE PRESSURE AFTER KICK IN DEEPWATER SHALLOW OPEN-CIRCUIT DRILLING

(71) Applicants: CHINA UNIVERSITY OF PETROLEUM (EAST CHINA), Qingdao (CN); BEIJING UNIVERSITY OF CHEMICAL TECHNOLOGY, Beijing (CN)

(72) Inventors: Jianbo Zhang, Qingdao (CN); Yang Yang, Qingdao (CN); Hui Liu, Beijing (CN); Xiaoao Liu, Beijing (CN); Jintang Wang, Qingdao (CN); Bo Zhang, Beijing (CN); Zhiyuan Wang, Qingdao (CN); Xiaohui Sun, Qingdao (CN); Jie Zhong, Qingdao (CN); Bangtang Yin, Qingdao (CN); Xuerui Wang, Qingdao (CN); Baojiang Sun, Qingdao (CN)

(73) Assignees: CHINA UNIVERSITY OF PETROLEUM (EAST CHINA), Qingdao (CN); BEIJING UNIVERSITY OF CHEMICAL TECHNOLOGY, Beijing (CN)

( * ) Notice: Subject to any disclaimer, the term of this patent is extended or adjusted under 35 U.S.C. 154(b) by 0 days.

(21) Appl. No.: 19/185,874

(22) Filed: Apr. 22, 2025

(30) Foreign Application Priority Data

Jul. 29, 2024 (CN) .......................... 202411018674.4

(51) Int. Cl.
*E21B 21/00* (2006.01)
*E21B 21/01* (2006.01)
(Continued)

(52) U.S. Cl.
CPC ............. *E21B 21/08* (2013.01); *E21B 21/001* (2013.01); *E21B 21/01* (2013.01); *E21B 41/04* (2013.01);
(Continued)

(58) Field of Classification Search
CPC ........ E21B 21/001; E21B 21/01; E21B 21/08; E21B 41/04; E21B 47/001; E21B 47/002;
(Continued)

(56) References Cited

U.S. PATENT DOCUMENTS

| | | | | |
|---|---|---|---|---|
| 8,136,597 | B2 * | 3/2012 | Calderoni | E21B 43/0122 166/250.01 |
| 8,767,063 | B1 * | 7/2014 | Berger, III | E21B 7/12 348/85 |

(Continued)

FOREIGN PATENT DOCUMENTS

| CN | 111827909 A | 10/2020 |
|---|---|---|
| CN | 116952938 A | 10/2023 |
| CN | 117372753 A | 1/2024 |

OTHER PUBLICATIONS

Gang Chen et al., A kick monitoring method for deepwater open-circuit drilling based on convolutional neural network Geoenergy Science and Engineering, vol. 234, pp. 1-15 Publication Date:Jan. 11, 2024.

*Primary Examiner* — Matthew R Buck
(74) *Attorney, Agent, or Firm* — CBM PATENT CONSULTING, LLC (57) ABSTRACT

Disclosed are a device and method for rapidly regulating downhole pressure after a kick in deepwater shallow open-circuit drilling. The device includes a real-time monitoring device and a real-time regulation device. Aiming at deepwater shallow open-circuit drilling characteristics, the present disclosure proposes that a drilling fluid return condition at a seabed is monitored through a subsea remote operated (Continued)

vehicle (ROV); based on this data, whether gas influx occurs in a downhole or not and changes of the gas influx rate and the formation pressure after the gas influx are analyzed in real time, and then real-time guidance is provided for the design of key parameters such as well killing fluid displacement and density, and the well killing fluid displacement and density are regulated in real time, to achieve rapid regulation of the downhole pressure after gas influx of deepwater shallow open-circuit drilling.

6 Claims, 1 Drawing Sheet

(51) Int. Cl.
   *E21B 21/08*   (2006.01)
   *E21B 41/04*   (2006.01)
   *E21B 47/001*  (2012.01)
   *E21B 47/002*  (2012.01)
   *G06T 7/20*    (2017.01)
   *G06T 7/70*    (2017.01)
   *H04N 7/18*    (2006.01)
(52) U.S. Cl.
   CPC .......... *E21B 47/001* (2020.05); *E21B 47/002* (2020.05); *G06T 7/20* (2013.01); *G06T 7/70* (2017.01); *H04N 7/183* (2013.01); *E21B 2200/20* (2020.05)
(58) Field of Classification Search
   CPC ......... E21B 2200/20; G06T 7/20; G06T 7/70; H04N 7/183
   See application file for complete search history.

(56) References Cited

U.S. PATENT DOCUMENTS

| | | | |
|---|---|---|---|
| 2007/0246221 A1* | 10/2007 | Jones | C09K 8/145 |
| | | | 166/358 |
| 2013/0265409 A1 | 10/2013 | Tjhang et al. | |
| 2014/0262309 A1 | 9/2014 | Cain et al. | |
| 2022/0270361 A1* | 8/2022 | Henley | E21B 47/002 |

* cited by examiner

DEVICE AND METHOD FOR RAPIDLY REGULATING DOWNHOLE PRESSURE AFTER KICK IN DEEPWATER SHALLOW OPEN-CIRCUIT DRILLING

CROSS-REFERENCE TO RELATED APPLICATIONS

This application claims priority to Chinese Patent Application Ser. No. CN 2024110186744 filed on 29 Jul. 2024.

FIELD OF THE INVENTION

The present disclosure relates to a device and method for rapidly regulating downhole pressure after a kick in deepwater shallow open-circuit drilling, and belongs to the technical field of marine oil and gas resource drilling.

BACKGROUND OF THE INVENTION

China has very rich deepwater oil and gas resources. According to statistics, the deepwater oil and gas reserves in the South China Sea exceed 70 billion tons.

Accordingly, to meet the demands of rapid economic and social development, safe and efficient exploitation of the deepwater oil and gas resources is an important way to address imbalance between supply and demand of oil and gas and build China into a maritime power. Drilling is a basis of deepwater oil and gas exploitation, and is a critical step in building a flowing channel between a deepwater oil and gas reservoir and a drilling/production platform, and safe drilling determines success and high efficiency of oil and gas resource exploitation in a later phase. Because a deepwater shallow formation has characteristics of shallow burial depth, high shaliness, poor diagenetic property, low formation strength, etc., to improve drilling efficiency in the deepwater shallow formation, an open-circuit drilling technology is commonly used in a deepwater shallow drilling process, that is, in drilling of the deepwater shallow formation, no marine riser or a blowout preventer is deployed, and instead, a drilling fluid carries rock debris in an annulus below a mud line and directly returns the rock debris to the seabed, thereby improving the drilling efficiency in the deepwater shallow formation and shortening a drilling period.

However, geological disasters such as shallow gas, shallow flow, and shallow hydrates are frequently encountered in the deepwater shallow drilling process; because the marine riser and the blowout preventer are not mounted in a deepwater shallow open-circuit drilling process, a complicated condition of gas influx is highly likely to occur in the drilling process; and under this condition, once a gas influx occurs, a well cannot be shut, which may lead to escalation of gas influx into a well kick or even a blowout. Existing well killing methods, such as a waiting-and-weighting technique and a driller's technique, are primarily designed to address a kick situation in a closed-loop drilling process, and wellhead parameters such as a mud pit increment, a casing pressure, and a void fraction, are required to be monitored in real time in a well killing process to invert downhole conditions. Because the drilling fluid does not return to a wellhead of the platform in the deepwater shallow open-circuit drilling process, and multiphase flow parameters in a wellbore cannot be monitored. This leads to a significant degree of blindness and uncertainty in controlling downhole pressure in the open-circuit drilling process. Furthermore, a gas influx process occurs very quickly, and if measures taken are improper, optimal intervention time is easily missed, further causing uncontrollability of the gas influx. Therefore, there is currently a lack of a safe and quick method for regulating downhole pressure after a kick in deepwater shallow open-circuit drilling. This problem is a key to restricting the safety in deepwater shallow open-circuit drilling, and is an important factor influencing safe and efficient deepwater oil and gas drilling. Therefore, a method for rapidly regulating a downhole pressure after a kick in deepwater shallow open-circuit drilling is urgently needed. For this purpose, the present disclosure is provided.

SUMMARY OF THE INVENTION

For shortcomings of the prior art, particularly a difficulty in rapidly and reasonably determining downhole pressure regulation parameters after a kick in deepwater shallow open-circuit drilling, the present disclosure provides a device and method for rapidly regulating downhole pressure after a kick in deepwater shallow open-circuit drilling, which ensures a quick and reasonable response to a kick in deepwater shallow open-circuit drilling by combining real-time observation of a remote operated vehicle (ROV), real-time formation pressure inversion, and real-time well killing parameter regulation. By the present disclosure, the kick in deepwater shallow open-circuit drilling can be quickly detected and controlled and is prevented from escalating into well influx and even blowout incidents, and theoretical and technical support is provided for safe and efficient deepwater shallow open-circuit drilling.

The present disclosure has the following technical solutions.

In an aspect, the present disclosure provides a device for rapidly regulating downhole pressure after a kick in deepwater shallow open-circuit drilling, including a real-time monitoring device and a real-time regulation device. The real-time monitoring device includes a subsea ROV, a data transmission cable, and a computer processing center; the subsea ROV is arranged at a seabed wellhead through a pulling rope, and is configured for shooting a drilling fluid return image at the seabed wellhead in real time; the pulling rope connects the subsea ROV and a platform, the subsea ROV is connected with the computer processing center through the data transmission cable, and the data transmission cable is tied to the pulling rope; and the computer processing center receives the drilling fluid return image shot by the subsea ROV in real time, and analyzes a regime and height of the returning drilling fluid in real time;

the real-time regulation device includes a signal receiving and executing mechanism, a drilling fluid injection pump, a mud pit, and a drilling fluid injection pipeline; one end of the signal receiving and executing mechanism is connected with the computer processing center, and the other end of the signal receiving and executing mechanism is connected with the drilling fluid injection pump; and the drilling fluid injection pump is connected with the mud pit, and is connected with the seabed wellhead through the drilling fluid injection pipeline; and the drilling fluid injection pipeline is provided with a valve, a pressure sensor, and a temperature sensor A, the mud pit is connected with a temperature sensor B, and the pressure sensor, the temperature sensor A, and the temperature sensor B are all connected with the computer processing center.

In another aspect, the present disclosure provides a method for rapidly regulating downhole pressure after a kick in deepwater shallow open-circuit drilling, which is implemented by the device for rapidly regulating downhole pressure after a kick in deepwater shallow open-circuit drilling, and comprises the following steps:

(1) real-time monitoring of a drilling fluid return condition at the seabed wellhead through the subsea ROV monitoring the drilling fluid return condition at the seabed wellhead in real time through the subsea ROV, transmitting the shot drilling fluid return image to the computer processing center on the platform in real time, and performing real-time analysis, by the computer processing center based on an existing database, on the image through an image processing technique to obtain drilling fluid return flow regime parameters;

(2) real-time calculation of a downhole gas influx rate and a formation pressure calculating the downhole gas influx rate and the formation pressure according to the drilling fluid return condition shot by the subsea ROV, the obtained drilling fluid return flow regime parameters, and basic parameters, to lay a foundation for designing well killing fluid parameters required by downhole pressure control; and (3) quick response to regulate downhole pressure designing key parameters such as well killing fluid density and displacement required by handling the kick and regulating the downhole pressure according to the calculated downhole gas influx rate and formation pressure, and controlling start, stop, and injection power of a drilling fluid injection pump; and meanwhile, quickly preparing a well killing fluid required on the platform, and timely injecting the well killing fluid to a downhole to regulate the downhole pressure to control gas influx, and monitoring and analyzing a gas influx control condition in real time.

Preferably, in step (1), the drilling fluid return flow regime parameters include a distance x from a drilling fluid return position to a drilling fluid return center and a drilling fluid return height H(x);

the computer processing center obtains the distance x from the drilling fluid return position to the drilling fluid return center, and the flow regime of the returning drilling fluid in deepwater open-circuit drilling conforms to a normal distribution function:

$$H(x) = \frac{1}{\sqrt{2\pi a}} \exp\left(-\frac{(x-b)^2}{a^2}\right) \quad (1)$$

where H(x) is the drilling fluid return height, in m; x is the distance from the drilling fluid return position to the drilling fluid return center, in m; a is a square root of x variance, in m; and b is an expected distance value, in m;

a maximum drilling fluid return height without gas influx can be calculated according to the following formula:

$$H_{max} = 1.065d\left(\frac{v_m}{\sqrt{dg(\rho-\rho_a)/\rho}}\right)^{1.287} \quad (2)$$

where $H_{max}$ is the maximum drilling fluid return height, in m; d is a return outlet equivalent diameter, in m; g is gravitational acceleration, in m/s$^2$; $\rho$ is a drilling fluid density, in kg/cm$^3$; $\rho_a$ is seawater density, in g/cm$^3$; and $v_m$ is a flow velocity of the returning drilling fluid, in m/s; and a maximum drilling fluid return height with gas influx can be calculated according to the following formula:

$$H_{max} = 4.744d\left(\frac{v_m}{\sqrt{dg(\rho-\rho_a)/\rho}}\right)^{0.4715} \quad (3)$$

Preferably, in step (2), before gas influx occurs in a wellbore, the drilling fluid flows in a single phase in the wellbore, so an initial downhole annular pressure can be calculated according to the following formula:

$$P_{wf}=P_c+\mu gh+\Delta P_{fa} \quad (4)$$

where $P_{wf}$ is a downhole annular pressure, in MPa; $P_c$ is a seabed wellhead pressure, in MPa; $P_{fa}$ is a single-phase flow annular friction pressure, in MPa; $\rho$ is the drilling fluid density, in kg/m$^3$; and h is a vertical height of a well below a mud line, in m;

according to Reynolds number, a flow regime in the wellbore is classified into laminar flow and turbulent flow, and in drilling engineering, when Re<2,100, the flow regime of the drilling fluid is the laminar flow; when Re≥2,100, the flow regime of the drilling fluid is the turbulent flow; and in different flow regimes of the drilling fluid, a debris carrying performance of the drilling fluid is different, and an annular friction pressure loss $\Delta P_{fa}$ is also different;

a calculation method for Reynolds number is as follows:

$$Re = \frac{\rho v_l d}{\mu_p} \quad (5)$$

where $v_l$ is an annular drilling fluid flow velocity, in m/s; d is an annular equivalent diameter, in m; and $\mu_p$ is a plastic viscosity, in Pa·s;

in the laminar flow regime, a calculation formula for the annular friction pressure loss is as follows:

$$\Delta P_{fa} = \frac{48\mu_p v_l}{(d_a-d_{po})^2} + \frac{0.02\tau_0}{d_a-d_{po}} \quad (6)$$

where $\tau_0$ is a dynamic cutting force, in MPa; $d_a$ is an annular inner diameter, in m; and $d_{po}$ is an outer diameter of a drill pipe, in m;

in the turbulent flow regime, a calculation formula for the annular friction pressure loss is as follows:

$$\Delta P_{fa} = \frac{2f\rho v_l^2}{d_a-d_{po}} \quad (7)$$

where f is a friction factor, dimensionless, and is calculated according to a formula (8):

$$\frac{1}{\sqrt{f}} = 4\log(Re\sqrt{f})-0.395 \quad (8)$$

after the downhole annular pressure $P_{wf}$ is obtained, the downhole gas influx rate can be calculated according to a formation productivity equation:

$$Q_{gd} = \frac{4\pi K_g (P'_e - P_{wf}) h_r}{\mu_g \left[2S + \log\left(\frac{4K_g t}{e^\gamma \phi \mu_g c r_w^2}\right)\right]} \quad (9)$$

where $Q_{gd}$ is the downhole gas influx rate, in m³/s; $K_g$ is a gas permeability in formation, in μm²; $P'_e$ is an assumed formation pressure, in MPa; $h_r$ is a height of an opened reservoir, in m; $\mu_g$ is a dynamic viscosity of gas, in Pa·s; S is a skin factor, dimensionless; t is gas influx occurrence time, in s; φ is a reservoir porosity, dimensionless; c is a reservoir gas compression coefficient, dimensionless; $r_w$ is a wellbore radius, in m; and y is Euler-Mascheroni constant (y≈0.577);

after gas influx occurs in deepwater open-circuit drilling, a gas-liquid multiphase flow process exists in the wellbore, and a wellbore multiphase flow model is shown as the following formulas:

liquid phase mass conservation equation:

$$\frac{\partial (\rho_l A_a E_l)}{\partial t} + \frac{\partial (\rho_l v_l A_a E_l)}{\partial z} = 0 \quad (10)$$

gas phase mass conservation equation:

$$\frac{\partial (\rho_g A_a E_g)}{\partial t} + \frac{\partial (\rho_g v_g A_a E_g)}{\partial z} = q_g \quad (11)$$

gas-liquid two phase mass momentum equation:

$$\frac{\partial (\rho_g v_g A_a E_g) + \rho_l v_l A_a E_l}{\partial t} + \frac{\partial (\rho_g v_g^2 A_a E_g + \rho_l v_l^2 A_a E_l)}{\partial z} = -\frac{\partial p_a}{\partial z} A_a - \frac{\partial p_{fa}}{\partial z} A_a - (\rho_g E_g + \rho_l E_l) A_a g \quad (12)$$

where $\rho_l$ and $\rho_g$ are a liquid phase density and a gas phase density respectively, in kg/m³; $E_l$ and $E_g$ are a liquid holdup and a gas holdup respectively, dimensionless; $A_a$ is an annular sectional area, in m²; $v_l$ and $v_g$ are an annular liquid phase velocity and an annular gas phase velocity respectively, in m/s; t is gas influx occurrence time, in s; z is an axial distance from the wellhead, in m; $P_a$ is a wellbore annular pressure, in MPa; $P_{fa}$ is the annular friction pressure, in MPa; and $q_g$ is an annular gas flow, in m³/s, and at a downhole boundary in the wellbore, $q_g$ is equal to $Q_{gd}$ calculated according to the formula (9), i.e. $Q_{gd}$ is a downhole input boundary condition of the gas phase mass conservation equation;

formulas (10), (11), and (12) are solved simultaneously, and instant key flow parameters, including the wellbore annular pressure $P_a$, the gas holdup $E_g$, and the annular gas phase velocity $v_g$, in the wellbore can be obtained;

a mud line gas influx rate is obtained through model calculation:

$$Q_{ca} = \sum_{i=0}^{N_{ml}} [(E_g \times A_a) \times \Delta h] \quad (13)$$

where $Q_{ca}$ is the mud line gas influx rate through model calculation, in m³/s; $N_{ml}$ is a well depth node at the mud line, dimensionless; and Δh is a space step size, in m;

meanwhile, according to the drilling fluid return height H(x) obtained through observation of the subsea ROV, the distance x, and formulas (1) to (3), the flow velocity $v_m$ of the returning drilling fluid can be obtained;

then, according to a formula (14), the annular gas phase velocity $v_g$ in the returning drilling fluid can be obtained:

$$v_m = v_g E_g + v_l(1 - E_g) \quad (14)$$

then, according to a formula (15), a gas influx rate of deepwater shallow open-circuit drilling calculated from measured data of the subsea ROV can be obtained:

$$Q_g = v_g A_a E_g \quad (15)$$

where $Q_g$ is the drilling gas influx rate calculated from the measured data of the subsea ROV, in m³/s; and $A_a$ is the annular sectional area, in m²; and according to formulas (1) to (3), (14) and (15), the gas influx rate derived is:

$$Q_q = \frac{H_{max}^{2.1209} \sqrt{g(\rho - \rho_a)/\rho}}{9.0573 \times 10^{-4} d^{1.6209}} - 4.1032 \times 10^4. \quad (16)$$

Preferably, in step (2), $Q_{ca}$ is compared with $Q_g$ to obtain a calculation error ε:

$$\varepsilon = |Q_{ca} - Q_g| \quad (17)$$

then, model calculation results are converged by a bisection method: if the calculated mud line gas influx rate value $Q_{ca}$ is smaller than the subsea ROV observation calculated value $Q_g$, the assumed formation pressure $P'_e$ is underestimated, in this case, $P'_e$ is increased by ΔP to obtain a new assumed formation pressure $P'_{e1}$, and the ΔP is between 0.1-3 MPa; the above steps are repeated until $Q_{ca}$ is equal to $Q_g$; and if the calculated mud line gas influx rate value $Q_{ca}$ is greater than the subsea ROV observation calculated value $Q_g$, the assumed formation pressure $P'_e$ is overestimated, and a new formation pressure is assumed directly according to a formula (18):

a next assumed formation pressure $P'_{en}$ is:

$$P'_{en} = \frac{|P'_{e(n-1)} - P'_{e(n-2)}|}{2} \quad (18)$$

until $Q_{ca}$ and $Q_g$ meet an error condition, the formation pressure $P_e$ is obtained.

Preferably, ΔP is 0.1-3 MPa.

Preferably, in step (3), because a certain time is needed for preparing the well killing fluid with a density required by well killing, the drilling fluid/well killing fluid displacement should be increased first to increase the downhole pressure to decrease a downhole gas influx quantity, which is achieved by controlling the power of the drilling fluid injection pump; and when the well killing fluid with the required density is prepared, the downhole pressure is controlled by combining new well killing fluid injection and displacement regulation.

Preferably, after gas influx occurs in deepwater shallow open-circuit drilling, the drilling/well killing fluid displacement is increased first to increase an annular flow friction, and then the downhole pressure is increased, to achieve objectives of decreasing the gas influx and balancing the formation pressure; and a calculation method for the required well killing fluid displacement is:

$$0.592 d_h^{2.5} \left( \frac{P_e - P_{wh} - \rho_l g h}{f \rho_l L} \right) < Q_L < \min\left( Q_S, 0.592 d_h^{2.5} \left( \frac{P_c - P_{wh} - \rho_l g h}{f \rho_l L} \right) \right)$$

where $d_h$ is an annular overflow section diameter, in m; $P_e$ is a deepwater shallow formation pressure, in Pa; $P_{wh}$ is a seawater hydrostatic pressure, in Pa; $\rho_l$ is a blending density of the drilling fluid during well killing and drilling, in kg/m³; g is the gravitational acceleration, in m/s²; h is a vertical height from the mud line to the downhole, in m; f is a friction factor, zero dimension; L is a well depth below the mud line, in m; $Q_L$ is drilling fluid displacement, in m³/min; $Q_s$ is a maximum displacement allowed by a drilling device, in m³/min; and $P_c$ is a minimum downhole fracturing pressure and leak-off pressure, in Pa;

meanwhile, the density of the injected well killing fluid is increased to increase gravitational effects of an annular fluid column, and with injection of a high-density well killing fluid to the downhole from a drill pipe and under the action of a friction applied by increased displacement, the downhole pressure is gradually increased accordingly, and the downhole gas influx quantity is gradually decreased; and to achieve successful well killing, according to the formation pressure obtained, the blending density of the required well killing fluid is calculated according to the following equation:

$$\frac{P_e - \rho_a g h_{sw}}{gh} \le \rho_l \le \frac{P_p - \rho_a g h_{sw}}{gh} \qquad (20)$$

where $\rho_a$ is the seawater density, in kg/m³; $h_{sw}$ is a seabed water depth at the mud line, in m; h is the vertical height from the mud line to the downhole, in m; $\rho_l$ is the blending density of the drilling fluid during well killing and drilling, in kg/m³; and $P_p$ is a downhole fracturing pressure, in Pa; and when the required well killing fluid is prepared, the downhole pressure is regulated jointly by injecting the well killing fluid and controlling the well killing fluid displacement to control downhole gas influx, and balance the formation pressure; and meanwhile, during well killing, the subsea ROV monitors the drilling fluid return condition at the seabed, allowing real-time analysis of the gas influx control condition until the downhole gas influx is fully controlled.

For any aspects of the present disclosure that are not detailed, refer to the prior art.

The present disclosure has the following beneficial effects.

Aiming at deepwater shallow open-circuit drilling characteristics, the present disclosure proposes that the drilling fluid return condition at the seabed is monitored through the subsea ROV, based on this data, whether gas influx occurs in the downhole or not and changes of the gas influx rate and the formation pressure after gas influx are analyzed in real time, and then real-time guidance is provided for the design of the key parameters such as well killing fluid displacement and density, and parameters of well killing fluid displacement and density are regulated in real time, to achieve rapid regulation of the downhole pressure after gas influx of deepwater shallow open-circuit drilling. Meanwhile, in a process of regulating the downhole pressure by injecting the (19)

well killing fluid, the ROV monitors the drilling fluid return condition at the seabed and then analyzes a downhole pressure regulation state, to achieve safe and rapid regulation of the downhole pressure after gas influx of deepwater shallow open-circuit drilling and guarantee safe and efficient deepwater oil and gas drilling.

BRIEF DESCRIPTION OF THE DRAWINGS

The accompanying drawings provide further understandings of the present disclosure and constitute part of the description of the present disclosure. The illustrative embodiments and explanations are intended to explain the present disclosure and do not serve as improper limitations on the scope of the present disclosure.

In the FIGURE, 1: seawater; 2: shallow seabed; 3: cementing sheath; 4: drill bit; 5: drill pipe; 6: returning drilling fluid; 7: subsea remote operated vehicle (ROV); 8: pulling rope; 9: seabed wellhead; 10: drilling fluid injection pipeline; 11: pressure sensor; 12: temperature sensor A; 13: valve; 14: drilling fluid injection pump; 15: mud pit; 16: temperature sensor B; 17: signal receiving and executing mechanism; and 18: computer processing center.

DETAILED DESCRIPTION OF THE EMBODIMENTS

Figure 1:
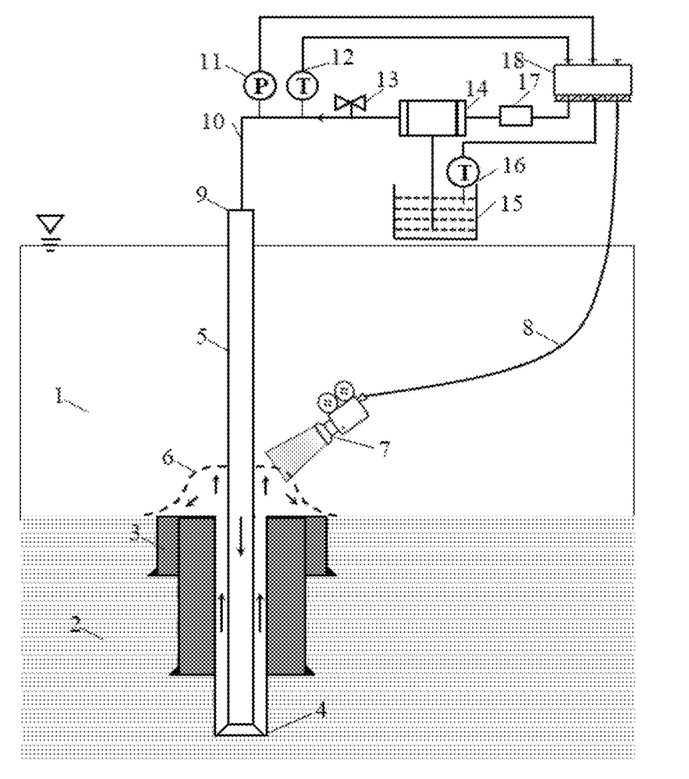
FIGURE is a schematic diagram of a device for rapidly regulating downhole pressure after a kick in deepwater shallow open-circuit drilling in an embodiment of the present disclosure.

To make those skilled in the art better understand technical solutions in the present disclosure, the technical solutions in the embodiments of the present disclosure will be clearly and completely described below with reference to the accompanying drawings in the embodiments of the present disclosure. However, the description is not limited to the embodiments, and any aspects not specifically detailed in the present disclosure are to be understood according to conventional techniques in the art.

Embodiment 1

A device for rapidly regulating downhole pressure after a kick in deepwater shallow open-circuit drilling, as shown in FIGURE includes a real-time monitoring device and a real-time regulation device. The real-time monitoring device includes a subsea remote operated vehicle (ROV) 7, a data transmission cable, and a computer processing center 18; the subsea ROV 7 is arranged at a seabed wellhead 9 through a pulling rope 8, is configured for shooting a drilling fluid return image at the seabed wellhead 9 in real time, and transmits the drilling fluid return image shot by the subsea ROV to the computer processing center in real time; the pulling rope 8 connects the subsea ROV 7 and a platform, the subsea ROV 7 is connected with the computer processing center 18 through the data transmission cable, and the data transmission cable is tied to the pulling rope 8; and the computer processing center 18 receives the drilling fluid return image shot by the subsea ROV 7 in real time, and analyzes a regime and height of the returning drilling fluid in real time.

The real-time regulation device includes a signal receiving and executing mechanism 17, a drilling fluid injection pump 14, a mud pit 15, and a drilling fluid injection pipeline 10; one end of the signal receiving and executing mechanism 17 is connected with the computer processing center 18, and the other end of the signal receiving and executing mechanism is connected with the drilling fluid injection pump 14; and the drilling fluid injection pump 14 is connected with the mud pit 15, and is connected with the seabed wellhead 9 through the drilling fluid injection pipeline 10.

The drilling fluid injection pipeline 10 is provided with a valve 13, a pressure sensor 11, and a temperature sensor A 12, the mud pit 15 is connected with a temperature sensor B 16, and the pressure sensor 11, the temperature sensor A 12, and the temperature sensor B 16 are all connected with the computer processing center 18.

In FIGURE the device further includes a drill bit 4, a shallow seabed 2, a cementing sheath 3, and a drill pipe 5; and the drill pipe 5 is placed deep into seawater 1, and the subsea ROV 7 is arranged at the seabed wellhead through the pulling rope and is configured for shooting the image of returning drilling fluid 6 at the seabed wellhead in real time.

In the present disclosure, the computer processing center 18 judges whether a kick occurs in a downhole or not and a kick degree by analyzing a regime and height of the returning drilling fluid, obtains parameters such as drilling fluid displacement, density, and the like required by control of the downhole pressure, and then sends an instruction to the signal receiving and executing mechanism; the signal receiving and executing mechanism receives the instruction from the computer processing center, and controls start, stop, and injection power of the drilling fluid injection pump; the drilling fluid injection pump is connected with the signal receiving and executing mechanism and the mud pit, and pumps the drilling fluid from the mud pit and injects the drilling fluid into the drill pipe through the drilling fluid injection pipeline after receiving a drilling fluid injection instruction; the temperature sensor A monitors a temperature of the drilling fluid injected into the drill pipe in real time, the pressure sensor monitors an injection pressure at the wellhead in real time, and the temperature sensor B monitors a temperature of the drilling fluid in the mud pit in real time; and the valve is mounted between the wellhead and the drilling fluid injection pump, and is opened when the drilling fluid is required to be injected.

Embodiment 2

A method for rapidly regulating downhole pressure after a kick in deepwater shallow open-circuit drilling includes the following steps:

(1) Real-Time Monitoring of a Drilling Fluid Return Condition at a Seabed Wellhead Through a Subsea ROV The subsea ROV monitors the drilling fluid return condition at the seabed wellhead in real time, and transmits a shot drilling fluid return image to a computer processing center on a platform in real time, and the computer processing center, based on an existing database, analyzes the image through an image processing technique to obtain drilling fluid return flow regime parameters;

(2) Real-Time Calculation of a Downhole Gas Influx Rate and a Formation Pressure The downhole gas influx rate and the formation pressure are calculated according to the drilling fluid return condition shot by the subsea ROV, the obtained drilling fluid return flow regime parameters, and basic parameters, to lay a foundation for designing well killing fluid parameters required by downhole pressure control; and (3) Quick Response to Regulate Downhole Pressure Key parameters such as well killing fluid density and displacement required by handling the kick and regulating the downhole pressure are designed according to the calculated downhole gas influx rate and formation pressure, and start, stop, and injection power of a drilling fluid injection pump are controlled; and meanwhile, a well killing fluid required on the platform is quickly prepared, and timely injected to a downhole to regulate the downhole pressure to control gas influx, and the subsea ROV monitors and analyzes a gas influx control condition in real time.

Embodiment 3

A method for rapidly regulating downhole pressure after a kick in deepwater shallow open-circuit drilling is different from embodiment 2 in that: in step (1), a subsea ROV 7 is placed down to a seabed wellhead 9 by a pulling rope 8, is capable of shooting a drilling fluid return image at the seabed wellhead in real time, and transmits the shot drilling fluid return image to a computer processing center on a drilling platform through a signal transmission cable. The computer processing center stores a drilling fluid return image database for deepwater shallow open-circuit drilling, and can obtain drilling fluid return flow regime parameters in a deepwater shallow open-circuit drilling process through an image processing technique based on an existing database and analysis and processing of the shot on-site drilling fluid return images, and the drilling fluid return flow regime parameters include a distance x from a drilling fluid return position to a drilling fluid return center and a drilling fluid return height H(x), thereby laying a foundation for calculating a downhole gas influx quantity.

The computer processing center obtains the distance x from the drilling fluid return position to the drilling fluid return center, and the flow regime of the returning drilling fluid in deepwater open-circuit drilling conforms to a normal distribution function:

$$H(x) = \frac{1}{\sqrt{2\pi a}} \exp\left(-\frac{(x-b)^2}{a^2}\right) \quad (1)$$

where H(x) is the drilling fluid return height, in m; x is the distance from the drilling fluid return position to the drilling fluid return center, in m; a is a square root of x variance, in m; b is an expected distance value, in m; if all data values of x exist, the b value is an arithmetic mean value of all data values; and if only one probability density function exists, the value can be calculated through integration;

a maximum drilling fluid return height without gas influx can be calculated according to the following formula:

$$H_{max} = 1.065 d \left(\frac{V_m}{\sqrt{dg(\rho - \rho_a)/\rho}}\right)^{1.287} \quad (2)$$

where $H_{max}$ is the maximum drilling fluid return height, in m; d is a return outlet equivalent diameter, in m; g is gravitational acceleration, in m/s²; ρ is a drilling fluid density, in/cm³; $ρ_a$ is seawater density, in g/cm³; and $v_m$ is a flow velocity of the returning drilling fluid, in m/s; and a maximum drilling fluid return height with gas influx can be calculated according to the following formula:

$$H_{max} = 4.744d \left( \frac{v_m}{\sqrt{dg(\rho - \rho_a)/\rho}} \right)^{0.4715} \quad (3)$$

During judgment of occurrence of gas influx, in an aspect, whether gas influx occurs or not can be judged through observation of the subsea ROV, and in case of gas influx, the returning drilling fluid will carry gas. Moreover, the magnitude of the flow velocity $v_m$ of the returning drilling fluid can be obtained according to the above calculation, and the calculated $v_m$ also can be compared with an annular liquid phase velocity vi (this value can be obtained through a ratio of drilling fluid displacement to an annular sectional area) to judge whether gas influx occurs or not. If $v_m$ is greater than vi, gas influx occurs, otherwise, gas influx does not occur.

Embodiment 4

A method for rapidly regulating downhole pressure after a kick in deepwater shallow open-circuit drilling is different from embodiment 3 in that: in step (2), a drilling fluid return condition in the deepwater shallow open-circuit drilling process is directly influenced by whether downhole gas influx occurs, a gas influx rate, a formation pressure, and the like. According to the drilling fluid return condition shot by a subsea ROV and flow parameter analysis and based on a wellbore multiphase flow theory, the downhole gas influx rate and the formation pressure at a gas influx location can be calculated.

Before gas influx occurs in a wellbore, a drilling fluid flows in a single phase in the wellbore, so an initial downhole annular pressure can be calculated according to the following formula:

$$P_{wf} = P_c + \rho g h + \Delta P_{fa} \quad (4)$$

where $P_{wf}$ is a downhole annular pressure, in MPa; $P_c$ is a seabed wellhead pressure, in MPa; $P_{fa}$ is a single-phase flow annular friction pressure, in MPa; ρ is a drilling fluid density, in kg/m³; and h is a vertical height of a well below a mud line, in m;

according to Reynolds number, a flow regime in the wellbore is classified into laminar flow and turbulent flow, and in drilling engineering, when Re<2,100, the flow regime of the drilling fluid is the laminar flow; when Re≥2,100, the flow regime of the drilling fluid is the turbulent flow; and in different flow regimes of the drilling fluid, a debris carrying performance of the drilling fluid is different, and an annular friction pressure loss $\Delta P_{fa}$ is also different;

a calculation method for the Reynolds number is as follows:

$$Re = \frac{\rho v_l d}{\mu_p} \quad (5)$$

where $v_l$ is an annular drilling fluid flow velocity, in m/s; d is an annular equivalent diameter, in m; and $\mu_p$ is a plastic viscosity, in Pa·s;

in the laminar flow regime, a calculation formula for the annular friction pressure loss is as follows:

$$\Delta P_{fa} = \frac{48 \mu_p v_l}{(d_a - d_{po})^2} + \frac{0.02 \tau_0}{d_a - d_{po}} \quad (6)$$

where $\tau_0$ is a dynamic cutting force, in MPa; $d_a$ is an annular inner diameter, in m; and $d_{po}$ is an outer diameter of a drill pipe, in m;

in the turbulent flow regime, a calculation formula for the annular friction pressure loss is as follows:

$$\Delta P_{fa} = \frac{2 f \rho V_l^2}{d_a - d_{po}} \quad (7)$$

where f is a friction factor, dimensionless, and is calculated according to a formula (8):

$$\frac{1}{\sqrt{f}} = 4 \log \left( Re \sqrt{f} \right) - 0.395 \quad (8)$$

after the downhole annular pressure $P_{wf}$ is obtained, the downhole gas influx rate can be calculated according to a formation productivity equation:

$$Q_{gd} = \frac{4 \pi K_g (P_e' - P_{wf}) h_r}{\mu_g \left[ 2S + \log \left( \frac{4 K_g t}{e^\gamma \phi \mu_g c r_w^2} \right) \right]} \quad (9)$$

where $Q_{gd}$ is the downhole gas influx rate, in m³/s; $K_g$ is a gas permeability in formation, in μm²; $P_e'$ is an assumed formation pressure, in MPa; $h_r$ is a height of an opened reservoir, in m; $\mu_g$ is a dynamic viscosity of gas, in Pa·s; S is a skin factor, dimensionless; t is gas influx occurrence time, in s; φ is a reservoir porosity, dimensionless; c is a reservoir gas compression coefficient, dimensionless; $r_w$ is a wellbore radius, in m; and y is Euler-Mascheroni constant (y≈0.577);

after gas influx occurs in deepwater open-circuit drilling, a gas-liquid multiphase flow process exists in the wellbore, and a wellbore multiphase flow model is shown as the following formulas:

liquid phase mass conservation equation:

$$\frac{\partial (\rho_l A_a E_l)}{\partial t} + \frac{\partial (\rho_l v_l A_a E_l)}{\partial z} = 0 \quad (10)$$

gas phase mass conservation equation:

$$\frac{\partial (\rho_g A_a E_g)}{\partial t} + \frac{\partial (\rho_g v_g A_a E_g)}{\partial z} = q_g \quad (11)$$

gas-liquid two phase mass momentum equation:

$$\frac{\partial(\rho_g v_g A_a E_g + \rho_l v_l A_a E_l)}{\partial t} + \frac{\partial(\rho_g v_g^2 A_a E_g + \rho_l v_l^2 A_a E_l)}{\partial z} = \quad (12)$$
$$-\frac{\partial p_a}{\partial z}A_a - \frac{\partial p_{fa}}{\partial z}A_a - (\rho_g E_g + \rho_l E_l)A_a g$$

where $\rho_l$ and $\rho_g$ are a liquid phase density and a gas phase density respectively, in kg/m³; $E_l$ and $E_g$ are a liquid holdup and a gas holdup respectively, dimensionless; $A_a$ is an annular sectional area, in m²; $v_l$ and $v_g$ are an annular liquid phase velocity and an annular gas phase velocity respectively, in m/s; t is gas influx occurrence time, in s; z is an axial distance from the wellhead, in m; $P_a$ is a wellbore annular pressure, in MPa; $P_{fa}$ is the annular friction pressure, in MPa; and $q_g$ is an annular gas flow, in m³/s, and at a downhole boundary in the wellbore, $q_g$ is equal to $Q_{gd}$ calculated according to formula (9), namely $Q_{gd}$ is a downhole input boundary condition of the gas phase mass conservation equation;

formulas (10), (11), and (12) are solved simultaneously, and instant key flow parameters, including the wellbore annular pressure $P_a$, the gas holdup $E_g$, and the annular gas phase velocity $v_g$, in the wellbore can be obtained;

a mud line gas influx rate is obtained through model calculation:

$$Q_{ca} = \sum_{i=}^{N_{ml}} [(E_g \times A_a) \times \Delta h] \quad (13)$$

where $Q_{ca}$ is the mud line gas influx rate through model calculation, in m³/s; $N_{ml}$ is a well depth node at the mud line, dimensionless; and $\Delta h$ is a space step size, in m;

meanwhile, according to the drilling fluid return height H(x) obtained through observation of the subsea ROV, the distance x, and formulas (1) to (3), the flow velocity $v_m$ of the returning drilling fluid is obtained;

then, according to a formula (14), the annular gas phase velocity $v_g$ in the returning drilling fluid can be obtained:

$$v_m = v_g E_g + v_l(1-E_g) \quad (14)$$

then, according to a formula (15), a gas influx rate of deepwater shallow open-circuit drilling calculated from measured data of the subsea ROV can be obtained:

$$Q_g = v_g A_a E_g \quad (15)$$

where $Q_g$ is the drilling gas influx rate calculated from the measured data of the subsea ROV, in m³/s; and $A_a$ is the annular sectional area, in m²; and according to formulas (1) to (3), (14) and (15), the gas influx rate derived is:

$$Q_g = \frac{H_{max}^{2.1209} \sqrt{g(\rho-\rho_a)/\rho}}{9.0573 \times 10^{-4} d^{1.6209}} - 4.1032 \times 10^4 \quad (16)$$

Preferably, in step (2), $Q_{ca}$ is compared with $Q_g$ to obtain a calculation error ε:

$$\varepsilon = |Q_{ca} - Q_g| \quad (17)$$

Then, model calculation results are converged by a bisection method: if the calculated mud line gas influx rate value $Q_{ca}$ is smaller than the subsea ROV observation calculated value $Q_g$, the assumed formation pressure $P_e'$ is underestimated, in this case, $P_e'$ is increased by $\Delta P$ to obtain a new assumed formation pressure $P_{el}'$, and then the above steps are repeated until $Q_{ca}$ is equal to $Q_g$; and if the calculated mud line gas influx rate value $Q_{ca}$ is greater than the subsea ROV observation calculated value $Q_g$, the assumed formation pressure $P_e'$ is overestimated, a new formation pressure is assumed directly according to a formula (18):

a next assumed formation pressure $P_{en}'$ is:

$$P_{en}' = \frac{|P_{e(n-1)}' - P_{e(n-2)}'|}{2} \quad (18)$$

until $Q_{ca}$ and $Q_g$ meet an error condition, the formation pressure $P_e$ is obtained.

Through the above calculation and analysis, the downhole gas influx rate and the formation pressure in the deepwater shallow drilling process can be obtained, thereby laying a foundation for designing well killing fluid parameters required by control of the downhole pressure in step (3).

Embodiment 5

A method for rapidly regulating downhole pressure after a kick in deepwater shallow open-circuit drilling is different from embodiment 4 in that: in step (3), once gas influx occurs in the deepwater shallow open-circuit drilling process, to prevent gas influx from escalating into a serious well influx or even a blowout incident, downhole pressure regulation measures should be taken immediately. In a downhole pressure regulation process, well killing fluid density and displacement are two most critical parameters for controlling the gas influx and regulating the downhole pressure. Because a certain time is needed for preparing the well killing fluid with a density required by well killing, the drilling fluid/well killing fluid displacement should be increased first to increase the downhole pressure to decrease a downhole gas influx quantity, which is achieved by controlling power of the drilling fluid injection pump; and when the well killing fluid with the required density is prepared, the downhole pressure is controlled by combining new well killing fluid injection and displacement regulation.

After gas influx occurs in deepwater shallow open-circuit drilling, the drilling/well killing fluid displacement is increased first to increase an annular flow friction, and then the downhole pressure is increased, to achieve objectives of decreasing the gas influx and balancing the formation pressure, and a calculation method for the required well killing fluid displacement is:

$$0.592 d_h^{2.5} \left(\frac{P_e - P_{wk} - \rho_l g h}{f \rho_l L}\right) < \quad (19)$$
$$Q_L < \min\left(Q_s, 0.592 d_h^{2.5}\left(\frac{P_e - P_{wh} - \rho_l g h}{f \rho_l L}\right)\right)$$

where $d_h$ is an annular overflow section diameter, in m; $P_e$ is a deepwater shallow formation pressure, in Pa; $P_{wh}$ is a seawater hydrostatic pressure, in Pa; $\rho_l$ is a blending density of the drilling fluid during well killing and drilling, in kg/m³; g is gravitational acceleration, in m/s²; h is a vertical height from the mud line to the downhole, in m; f is a friction factor, zero dimension;

L is a well depth below the mud line, in m; $Q_L$ is drilling fluid displacement, in m³/min; $Q_s$ is a maximum displacement allowed by a drilling device, in m³/min; and $P_c$ is a minimum downhole fracturing pressure and leak-off pressure, in Pa;

meanwhile, the density of the injected well killing fluid is increased to increase the gravitational effects of an annular fluid column, and with injection of a high-density well killing fluid to the downhole from a drill pipe and under the action of a friction applied by increased displacement, the downhole pressure is gradually increased accordingly, and the downhole gas influx quantity is gradually decreased; and to achieve successful well killing, according to the formation pressure obtained, the blending density of the required well killing fluid is calculated according to the following equation:

$$\frac{P_e - \rho_a g h_{sw}}{gh} \le \rho_l \le \frac{P_p - \rho_a g h_{sw}}{gh} \quad (20)$$

where $\rho_a$ is seawater density, in kg/m³; $h_{sw}$ is a seabed water depth at the mud line, in m; h is the vertical height from the mud line to the downhole, in m; $\rho_l$ the blending density of the drilling fluid during well killing and drilling, in kg/m³; and $P_p$ is a downhole fracturing pressure, in Pa; and when the required well killing fluid is prepared, the downhole pressure is regulated jointly by injecting the well killing fluid and controlling the well killing fluid displacement, to control downhole gas influx, and balance the formation pressure; and meanwhile, during well killing, a subsea ROV monitors the drilling fluid return condition at the seabed, allowing real-time analysis of the gas influx control condition, until the downhole gas influx is fully controlled, which can be judged by whether the returning drilling fluid has gas or not through observation of the subsea ROV, and absence of gas indicates effective control of gas influx.

The above mentioned are preferable embodiments of the present disclosure. It should be pointed out that some improvements and refinements can be made by those of ordinary skill in the art without separating from the principle, and shall fall within the scope of protection of the present disclosure.

What is claimed is:

1. A method for rapidly regulating downhole pressure after a kick in deepwater shallow open-circuit drilling, wherein the method is implemented by a device for rapidly regulating downhole pressure after a kick in deepwater shallow open-circuit drilling, and the device comprises a real-time monitoring device and a real-time regulation device, wherein the real-time monitoring device comprises a subsea remote operated vehicle (ROV), a data transmission cable, and a computer processing center; the subsea ROV is arranged at a seabed wellhead through a pulling rope, and is configured for shooting a drilling fluid return image at the seabed wellhead in real time; the pulling rope connects the subsea ROV and a platform, the subsea ROV is connected with the computer processing center through the data transmission cable, and the data transmission cable is tied to the pulling rope; and the computer processing center receives the drilling fluid return image shot by the subsea ROV in real time, and analyzes a regime and height of a returning drilling fluid in real time;

the real-time regulation device comprises a signal receiving and executing mechanism, a drilling fluid injection pump, a mud pit, and a drilling fluid injection pipeline; one end of the signal receiving and executing mechanism is connected with the computer processing center, and the other end of the signal receiving and executing mechanism is connected with the drilling fluid injection pump; and the drilling fluid injection pump is connected with the mud pit, and is connected with the seabed wellhead through the drilling fluid injection pipeline; and the drilling fluid injection pipeline is provided with a valve, a pressure sensor, and a temperature sensor A, the mud pit is connected with a temperature sensor B, and the pressure sensor, the temperature sensor A, and the temperature sensor B are all connected with the computer processing center;

the method for rapidly regulating downhole pressure after a kick in deepwater shallow open-circuit drilling, comprising the following steps:

(1) real-time monitoring of a drilling fluid return condition at the seabed wellhead through the subsea ROV by monitoring the drilling fluid return condition at the seabed wellhead in real time through the subsea ROV, transmitting the shot drilling fluid return image to the computer processing center on the platform in real time, and performing real-time analysis, by the computer processing center on the image through an image processing technique to obtain drilling fluid return flow regime parameters;

(2) real-time calculation of a downhole gas influx rate and a formation pressure by calculating the downhole gas influx rate and the formation pressure according to the drilling fluid return condition shot by the subsea ROV and the obtained drilling fluid return flow regime parameters; and (3) quick response to regulate downhole pressure by designing key parameters, as the parameters comprise well killing fluid density and displacement required by handling the kick and regulating the downhole pressure according to the calculated downhole gas influx rate and formation pressure, and controlling start, stop, and injection power of the drilling fluid injection pump; and meanwhile, quickly preparing a well killing fluid required on the platform, and timely injecting the well killing fluid to a downhole position to regulate the downhole pressure so as to control gas influx, and monitoring and analyzing a gas influx control condition in real time through the subsea ROV;

in step (1), the drilling fluid return flow regime parameters comprise a distance x from a drilling fluid return position to a drilling fluid return center and a drilling fluid return height H(x);

the computer processing center obtains the distance x from the drilling fluid return position to the drilling fluid return center through the image processing technique, and a flow regime of the returning drilling fluid in deepwater open-circuit drilling conforms to a normal distribution function:

$$H(x) = \frac{1}{\sqrt{2\pi} a} \exp\left(-\frac{(x-b)^2}{a^2}\right) \quad (1)$$

wherein H(x) is the drilling fluid return height, in m; x is the distance from the drilling fluid return position to the drilling fluid return center, in m; a is a square root of x variance, in m; and b is an expected distance value, in m;

a maximum drilling fluid return height without the gas influx is calculated according to the following formula:

$$H_{max} = 1.065 d \left( \frac{v_m}{\sqrt{dg(\rho - \rho_a)/\rho}} \right)^{1.287} \tag{2}$$

wherein $H_{max}$ is the maximum drilling fluid return height, in m; d is a return outlet equivalent diameter, in m; g is gravitational acceleration, in m/s²; $\rho$ is a drilling fluid density, in/cm³; $\rho_a$ is seawater density, in g/cm³; and $v_m$ is a flow velocity of the returning drilling fluid, in m/s; and a maximum drilling fluid return height with the gas influx is calculated according to the following formula:

$$H_{max} = 4.744 d \left( \frac{v_m}{\sqrt{dg(\rho - \rho_a)/\rho}} \right)^{0.4715}. \tag{3}$$

2. The method for rapidly regulating downhole pressure after a kick in deepwater shallow open-circuit drilling according to claim 1, wherein in step (2), before the gas influx occurs in a wellbore, the drilling fluid flows in a single phase in the wellbore, so an initial downhole annular pressure is calculated according to the following formula:

$$P_{wf} = P_c + \rho g h + \Delta P_{fa} \tag{4}$$

wherein $P^{wf}$ is a downhole annular pressure, in MPa; $P_c$ is a seabed wellhead pressure, in MPa; $P_{fa}$ is a single-phase flow annular friction pressure, in MPa; $\rho$ is a drilling fluid density, in kg/m³; and h is a vertical height of a well below a mud line, in m;

according to Reynolds number, the flow regime in the wellbore is classified into laminar flow and turbulent flow; when Re<2,100, the flow regime of the drilling fluid is the laminar flow; when Re≥2,100, the flow regime of the drilling fluid is the turbulent flow; and in different flow regimes of the drilling fluid, a debris carrying performance of the drilling fluid is different, and an annular friction pressure loss $\Delta P_{fa}$ is also different;

a calculation method for Reynolds number is as follows:

$$Re = \frac{\rho v_l d}{\mu_p} \tag{5}$$

wherein $v_l$ is an annular drilling fluid flow velocity, in m/s; d is an annular equivalent diameter, in m; and $\mu_p$ is a plastic viscosity, in Pa·s;

in the laminar flow regime, a calculation formula for the annular friction pressure loss is as follows:

$$\Delta P_{fa} = \frac{48 \mu_p v_l}{(d_a - d_{po})^2} + \frac{0.02 \tau_0}{d_a - d_{po}} \tag{6}$$

wherein $\tau_0$ is a dynamic cutting force, in MPa; $d_a$ is an annular inner diameter, in m; and $d_{po}$ is an outer diameter of a drill pipe, in m;

in the turbulent flow regime, a calculation formula for the annular friction pressure loss is as follows:

$$\Delta P_{fa} = \frac{2 f \rho v_l^2}{d_a - d_{po}} \tag{7}$$

wherein f is a friction factor, dimensionless, and calculated according to a formula (8):

$$\frac{1}{\sqrt{f}} = 4 \log(Re \sqrt{f}) - 0.395 \tag{8}$$

after the downhole annular pressure $P_{wf}$ is obtained, the downhole gas influx rate is calculated according to a formation productivity equation:

$$Q_{gd} = \frac{4 \pi K_g (P_e' - P_{wf}) h_r}{\mu_g \left[ 2S + \log\left( \frac{4 K_g t}{e^\gamma \phi \mu_g c r_w^2} \right) \right]} \tag{9}$$

wherein $Q_{gd}$ is the downhole gas influx rate, in m³/s; $K_g$ is a gas permeability in formation, in μm²; $P_e'$ is an assumed formation pressure, in MPa; $h_r$ is a height of an opened reservoir, in m; $\mu_g$ is a dynamic viscosity of gas, in Pa·s; S is a skin factor, dimensionless; t is gas influx occurrence time, in s; $\phi$ is a reservoir porosity, dimensionless; c is a reservoir gas compression coefficient, dimensionless; $r_w$ is a wellbore radius, in m; and y is the Euler-Mascheroni constant;

after the gas influx occurs in the deepwater open-circuit drilling, a gas-liquid multiphase flow process exists in the wellbore, and a wellbore multiphase flow model is shown as the following formulas:

liquid phase mass conservation equation:

$$\frac{\partial (\rho_l A_a E_l)}{\partial t} + \frac{\partial (\rho_l v_l A_a E_l)}{\partial z} = 0 \tag{10}$$

gas phase mass conservation equation:

$$\frac{\partial (\rho_g A_a E_g)}{\partial t} + \frac{\partial (\rho_g v_g A_a E_g)}{\partial z} = q_g \tag{11}$$

gas-liquid two phase mass momentum equation:

$$\frac{\partial (\rho_g v_g A_a E_g + \rho_l v_l A_a E_l)}{\partial t} + \frac{\partial (\rho_g v_g^2 A_a E_g + \rho_l v_l^2 A_a E_l)}{\partial z} = \tag{12}$$
$$-\frac{\partial p_a}{\partial z} A_a - \frac{\partial p_{fa}}{\partial z} A_a - (\rho_g E_g + \rho_l E_l) A_a g$$

wherein $\rho_l$ and $\rho_g$ are a liquid phase density and a gas phase density respectively, in kg/m³; $E_l$ and $E_g$ are a liquid holdup and a gas holdup respectively, dimensionless; $A_a$ is an annular sectional area, in m²; $v_l$ and $v_g$ are an annular liquid phase velocity and an annular gas phase velocity respectively, in m/s; t is the gas influx occurrence time, in s; z is an axial distance from the wellhead, in m; $P_a$ is a wellbore annular pressure, in MPa; $P_{fa}$ is the annular friction pressure, in MPa; and $q_g$ is a gas flow in an annulus, in m³/s, and at a downhole boundary in the wellbore, $q_g$ is equal to $Q_{gd}$ calculated according to the formula (9);

formulas (10), (11), and (12) are solved simultaneously, and instant key flow parameters, comprising the wellbore annular pressure $P_a$, the gas holdup $E_g$, and the annular gas phase velocity $v_g$, in the wellbore are obtained;

a mud line gas influx rate is obtained through model calculation:

$$Q_{ca} = \sum_{i=0}^{N_m} [(E_g \times A_a) \times \Delta h] \quad (13)$$

wherein $Q_{ca}$ is the mud line gas influx rate obtained through model calculation, in m³/s; $N_{ml}$ is a well depth node at the mud line, dimensionless; and $\Delta h$ is a space step size, in m;

meanwhile, according to the drilling fluid return height H(x) obtained through observation of the subsea ROV, the distance x, and formulas (1) to (3), the flow velocity of the returning drilling fluid $v_m$ is obtained;

then, according to a formula (14), the annular gas phase velocity $v_g$ in the returning drilling fluid is obtained:

$$v_m = v_g E_g + v_l(1-E_g) \quad (14)$$

then, according to a formula (15), a gas influx rate of deepwater shallow open-circuit drilling calculated from measured data of the subsea ROV is obtained:

$$Q_g = v_g A_a E_g \quad (15)$$

wherein $Q_g$ is the drilling gas influx rate calculated from measured data of the subsea ROV, in m³/s; and $A_a$ is the annular sectional area, in m²; and according to formulas (1) to (3), (14) and (15), the gas influx rate derived is:

$$Q_g = \frac{H_{max}^{2.1209} \sqrt{g(\rho - \rho_a)/\rho}}{9.0573 \times 10^{-4} d^{1.6209}} - 4.1032 \times 10^4. \quad (16)$$

3. The method for rapidly regulating downhole pressure after a kick in deepwater shallow open-circuit drilling according to claim 2, wherein in step (2), $Q_{ca}$ is compared with $Q_g$ to obtain a calculation error ε:

$$\varepsilon = Q_{ca} - Q_g \quad (17)$$

if a calculated mud line gas influx rate value $Q_{ca}$ is smaller than a subsea ROV observation calculated value $Q_g$, the assumed formation pressure $P_e'$ is underestimated, in this case, $P_e'$ is increased by ΔP to obtain a new assumed formation pressure $P_{e1}'$, and then the above steps are repeated until $Q_{ca}$ is equal to $Q_g$; and if the calculated mud line gas influx rate value $Q_{ca}$ is greater than the subsea ROV observation calculated value $Q_g$, the assumed formation pressure $P_e'$ is overestimated, a new formation pressure is assumed directly according to a formula (18):

a next assumed formation pressure $P_{en}'$ is:

$$P_{en}' = \frac{|P_{e(n-1)}' - P_{e(n-2)}'|}{2} \quad (18)$$

until $Q_{ca}$ and $Q_g$ meet an error condition, a formation pressure $P_e$ is obtained.

4. The method for rapidly regulating downhole pressure after a kick in deepwater shallow open-circuit drilling according to claim 3, wherein ΔP is 0.1-3 MPa.

5. The method for rapidly regulating downhole pressure after a kick in deepwater shallow open-circuit drilling according to claim 4, wherein in step (3), because time is needed for preparing the well killing fluid with a density required by well killing, drilling fluid/well killing fluid displacement is increased first to increase the downhole pressure to decrease a downhole gas influx quantity, which is achieved by controlling the power of the drilling fluid injection pump; and when the well killing fluid with the required density is prepared, the downhole pressure is controlled by combining new well killing fluid injection and displacement regulation.

6. The method for rapidly regulating downhole pressure after a kick in deepwater shallow open-circuit drilling according to claim 5, wherein after the gas influx occurs in deepwater shallow open-circuit drilling, the drilling/well killing fluid displacement is increased first to increase an annular flow friction, and then the downhole pressure is increased, to achieve objectives of decreasing the gas influx and balancing the formation pressure; and a calculation method for the required well killing fluid displacement is:

$$0.592 d_h^{2.5} \left(\frac{P_e - P_{vh} - \rho_l gh}{f \rho_l L}\right) < \quad (19)$$

$$Q_L < \min\left(Q_s, 0.592 d_h^{2.5}\left(\frac{P_c - P_{wh} - \rho_l gh}{f \rho_l L}\right)\right)$$

wherein $d_h$ is an annular overflow section diameter, in m; $P_e$ is a deepwater shallow formation pressure, in Pa; $P_{wh}$ is a seawater hydrostatic pressure, in Pa; $\rho_l$ is a blending density of the drilling fluid during well killing and drilling, in kg/m³; g is the gravitational acceleration, in m/s²; h is a vertical height from the mud line to the downhole, in m; f is a friction factor, zero dimension; L is a well depth below the mud line, in m; $Q_L$ is drilling fluid displacement, in m³/min; $Q_s$ is a maximum displacement allowed by a drilling device, in m³/min; and $P_c$ is a minimum downhole fracturing pressure and leak-off pressure, in Pa;

meanwhile, the density of the injected well killing fluid is increased to increase the gravitational effects of an annular fluid column; with injection of a high-density well killing fluid to the downhole from a drill pipe and under the action of friction applied by increased displacement, the downhole pressure is gradually increased accordingly, and a downhole gas influx quantity is gradually decreased; and to achieve successful well killing, the blending density of the required well killing fluid is calculated according to the following equation:

$$\frac{P_e - \rho_a g h_{sw}}{gh} \leq \rho_l \leq \frac{P_p - \rho_a g h_{sw}}{gh} \quad (20)$$

wherein $\rho_a$ is seawater density, in kg/m³; $h_{sw}$ is a seabed water depth at the mud line, in m; h is the vertical height from the mud line to the downhole, in m; $\rho_l$ the blending density of the drilling fluid during well killing and drilling, in kg/m³; and $P_p$ is a downhole fracturing pressure, in Pa; and when the required well killing fluid is prepared, the downhole pressure is regulated jointly by injecting the well killing fluid and controlling the well killing fluid displacement, to control downhole gas influx, and balance the formation pressure; and meanwhile, during well killing, the subsea ROV monitors the drilling fluid return condition at the seabed, allowing real-time analysis of the gas influx control condition until the downhole gas influx is fully controlled.

* * * * *